United States Patent [19]
von Bonin et al.

[11] 4,098,731
[45] Jul. 4, 1978

[54] PROCESS FOR THE PRODUCTION OF FOAMS

[75] Inventors: Wulf von Bonin; Helmut Kleimann; Jozsef Ivanyi, all of Leverkusen, Germany

[73] Assignee: Bayer Aktiengesellschaft, Leverkusen, Germany

[21] Appl. No.: 775,090

[22] Filed: Mar. 7, 1977

Related U.S. Application Data

[63] Continuation of Ser. No. 588,537, Jun. 19, 1975, abandoned.

[30] Foreign Application Priority Data

Jul. 3, 1974 [DE] Fed. Rep. of Germany ....... 2431968

[51] Int. Cl.² ............................................. C08G 18/18
[52] U.S. Cl. ...................................... 521/51; 264/53; 264/54; 521/129
[58] Field of Search .................. 260/2.5 AC, 2.5 AZ, 260/2.5 AG, 2.5 BD; 264/53, 54

[56] References Cited

U.S. PATENT DOCUMENTS

| | | | |
|---|---|---|---|
| 2,921,915 | 1/1960 | Brochhagen et al. | 260/2.5 AC |
| 2,932,621 | 4/1960 | Terry | 260/2.5 AC |
| 3,726,952 | 4/1973 | Boden et al. | 264/48 |

FOREIGN PATENT DOCUMENTS

| | | | |
|---|---|---|---|
| 214,810 | 5/1957 | Australia | 260/2.5 AC |
| 587,370 | 11/1959 | Canada | 260/2.5 AZ |
| 651,638 | 11/1962 | Canada | 260/2.5 AC |
| 2,121,670 | 11/1972 | Fed. Rep. of Germany | 260/2.5 AZ |
| 794,051 | 4/1958 | United Kingdom | 260/2.5 AC |
| 879,167 | 10/1961 | United Kingdom | 260/2.5 AC |
| 967,443 | 8/1964 | United Kingdom | 260/2.5 AC |
| 1,160,042 | 7/1969 | United Kingdom | 260/2.5 AZ |

*Primary Examiner*—Eugene C. Rzucidlo
*Attorney, Agent, or Firm*—Gene Harsh; Joseph C. Gil

[57] ABSTRACT

The present invention relates to the production in closed molds, of foams with outstanding mold-release properties. These improved properties are obtained by including in the foamable mixture salts of saturated or unsaturated aliphatic or cycloaliphatic carboxylic acids having at least 8 carbon atoms and tertiary amines of the type in which the atom ratio of tertiary amine nitrogen to carbon in the molecule is between 1:3 and 1:12.

7 Claims, No Drawings

PROCESS FOR THE PRODUCTION OF FOAMS

This is a continuation, of application Ser. No. 588,537, filed Jun. 19, 1975, now abandoned.

BACKGROUND OF THE INVENTION

Foams based on polyisocyanates such as polyurethane foams having an impervious outer skin and a cellular core, of the type obtained by the in-mold foaming technique (note, e.g. German Auslegeschrift No. 1,196,864 and French Pat. No. 1,559,325), are eminently suitable for the mass production of lightweight structures, such as those used in furniture making, vehicle construction and house building.

Such polyurethane moldings are generally produced by introducing the foamable reaction mixture consisting of polyisocyanates, compounds with at least two isocyanate-reactive hydrogen atoms, and additives, into closed temperable molds in which it foams and solidifies under heavy compression. The foamable reaction mixture exactly fills the mold and reproduces the inner surfaces thereof.

It is generally preferred to use molds made from a material with as high a heat capacity and as high a thermal conductivity as possible, preferably metal. However, it is also possible to use other materials, such as plastics, glass, wood, and the like.

In order to prevent the molding from adhering to the surface of the mold when the mold is opened, the mold is coated with a release agent. Examples of release agents currently in use include waxes, soaps or oils. These external release agents form a thin film between the surface of the mold and the molding, which film does not adhere either to the mold or to the plastic material, and thus enables the molding to be readily removed from the mold.

This method has a number of disadvantages where mass production is desired. The release agent has to be applied at regular intervals, and, during that period, the mold is out of service. Fine engravings on the mold surface such as imitation wood or leather grain, become covered with residues of release agent over a period of time. The removal of these firmly adhering residues from the, often, very complicated molds involves considerable time and expense. The plastic moldings are coated with a thin film of release agent to which lacquer systems are unable to adhere. Before lacquering, the moldings have to be ground or treated with solvents in order to obtain adequate adhesion between the lacquer and the plastics material.

It is known that the need to coat the mold with a release agent may be eliminated by adding to the foamable reaction mixture, certain additives which provide the finished molding with outstanding release properties in metal molds, (See, e.g., U.S. Pat. No. 3,726,952). Additives of this type include salts, containing at least 25 carbon atoms, of aliphatic carboxylic acids with primary amines or amines containing amide or ester groups.

German Offenlegungsschrift No. 2,121,670 relates to a process for the production of foams by foaming a reaction mixture of polyisocyanates, compounds containing reactive hydrogen atoms, water and/or organic blowing agents and additives in a closed mold, wherein a mixture of (a) salts, containing at least 20 aliphatic carbon atoms, of aliphatic carboxylic acids and, optionally, amines containing amide and/or ester groups, and (b) natural and/or synthetic oils, fats or waxes is added to the foamable mixture.

Since agents of this type internally lubricate the plastics mixture, they also provide the plastics material with outstanding flow properties in the mold with reduced bubble formation on the plastics surface. In addition, these internal release agents have an antistatic effect and show outstanding release properties even in metal molds with heavily textured surfaces.

Although outstanding release effects in the case of hard plastics may be obtained by conventional processes, it has frequently been found in practical application that the esters of higher fatty acids or the mixed esters thereof, often used as synthetic oils or waxes, still produce inadequate release properties in cases where certain elastomeric foam plastics are to be obtained. The same also applies to the use of the aforementioned salts of aliphatic carboxylic acids.

Accordingly, there was a need to find internal release agents of the type which also develop outstanding release properties in the production of elastomeric polyurethane foams with a cellular core and impervious outer skin.

In the search for release agents with a more favorable release effect with elastomeric, polyurethane foams produced by the in-mold foaming technique, it has been found that additions of higher carboxylic acids, such as oleic acid or other unsaturated higher fatty acids, especially natural or synthetic, commercial-grade fatty acid mixtures containing oleic acid, produce a certain release effect when added to the polyol side of the reaction mixture. Unfortunately, this effect is extremely difficult to exploit in practice because the addition of acid in the quantities required for effective separation seriously retards the reaction of the system, especially the reaction in the initial stages of foam formation. Additionally, both cell structure and stability of the foams are undesirably affected. Finally, the mold-release times of the molding increase and the initial stiffness of the molding is too low.

DESCRIPTION OF THE INVENTION

It has now been found that these disadvantages do not arise in cases where salts of (a) saturated or unsaturated aliphatic or cycloaliphatic carboxylic acids containing at least 8 carbon atoms and, (b) tertiary amines of the type which do not contain any amide or ester groups and in which the atom ratio of tertiary amine nitrogen to carbon in the amine molecule is between 1:3 and 1:12, are used as release agents.

By using the release agents of the instant invention, it is possible to obtain moldings which may be smoothly released even from steel molds without any need to apply an external release agent. The mold release times may be kept short and the moldings show favorable initial stiffness. Surprisingly, it has also been found that, even in the event of repeated mold release from a steel mold which is not subjected to intermediate cleaning, there is no build-up of material on the surface of the mold, although this has been found to be the case after only a few production cycles in attempts to obtain release by means of pure fatty acids. This represents another technical advantage of the invention because the release agents used in the process according to the invention essentially eliminate the need for intermediate cleaning of mold surfaces.

Accordingly, the invention relates to a process for the production of mold-formed foam plastics with self-releasing properties by foaming a reaction mixture of organic polyisocyanates, compounds with reactive hydrogen atoms having molecular weights of from 62 to 1000, water and/or organic blowing agents and, optionally, other additives, which is distinguished by the fact that salts of (a) saturated or unsaturated aliphatic or cycloaliphatic carboxylic acids with at least 8 carbon atoms and, (b) tertiary amines of the type in which the atom ratio of tertiary amine nitrogen to carbon in the molecule is between 1:3 and 1:12, are used as release agents.

The release effect may be assessed subjectively by manually opening a suitable mold and removing the square of foam (e.g., 20 × 20 × 1 cm). The mold-release forces which have to be applied in the case of the foams treated with the novel release agents herein are considerably lower than those which have to be applied in the case of the same foams produced without these additives.

The release agents according to the invention are also effective in cases where foam production is carried out in the absence of blowing agents, i.e. in cases where more or less compact moldings rather than foams in the strict sense are obtained by the reaction injection molding process.

The foams used in the process according to the invention are primarily the known mold-foamed polyurethane foams. However, the release agents essential to the invention may also be used with equal advantage in the production of other mold-formed foams based on polyisocyanates, of the type obtainable from polyisocyanates alone in the absence of compounds containing at least two Zerewitinoff-active hydrogen atoms, such as polycarbodiimide, polyisocyanurate, polyurea, polybiuret or polyamide foams, mixed foams or other foams based on polyisocyanates.

The polyisocyanates used in the instant invention include essentially any organic polyisocyanate, including aliphatic, cycloaliphatic, araliphatic, aromatic and heterocyclic polyisocyanates, of the type described for example by W. Siefgen in Justus Liebigs Annalen der Chemie, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and, mixtures of these isomers; 1-isocyanato-3,3,5-trimethyl-5-isocyanatomethylcyclohexane (German Auslegeschrift 1,202,785); 2,4- and 2,6-hexahydrotolylene diisocyante, and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate, and mixtures of these isomers; diphenylmethane-2,4'- and/or -4,4'-diisocyanate; naphthylene-1,5-diisocyanate; triphenylmethane-4,4',4''-triisocyanate; polyphenyl polymethylene polyisocyanates of the type obtained by condensing aniline with formaldehyde, followed by condensation, and described for example, in British Pat. Nos. 874,430 and 848,671; perchlorinated aryl-polyisocyanates of the type described in German Auslegeschrift No. 1,157,601; polyisocyanates containing carbodiimide groups of the type described in German Pat. 1,092,007; diisocyanates of the type described in U.S. Pat. No. 3,492,330; polyisocyanates containing allophanate groups of the type described in British Pat. No. 994,890, Belgian Pat. No. 761,262 and published Dutch Patent Application No. 7,102,524; polyisocyanates containing isocyanurate groups of the type described in German Pat. Nos. 1,022,789, 1,222,067, and 1,027,394, and in German Offenlegungsschrift No. 1,929,034, and 2,004,048; polyisocyanates containing urethane groups of the type described in Belgian Pat. No. 752,261 or in U.S. Pat. No. 3,394,164; polyisocyanates containing acylated urea groups as described in German Pat. No. 1,230,778; polyisocyanates containing biuret groups of the type described in German Pat. No. 1,101,394, in British Pat. No. 889,050, and in French Pat. No. 7,017,514; polyisocyanates obtained by telomerization reactions of the type described in Belgian Pat. No. 723,640; polyisocyanates containing ester groups of the type described, in British Pat. Nos. 965,474 and 1,072,956, in the U.S. Pat. No. 3,567,763 and in German Pat. No. 1,231,688; and, reaction products of the aforementioned isocyanates with acetals according to German Pat. No. 1,072,385.

It is also possible to use the distillation residues containing isocyanate groups of the type accumulating in the commercial production of isocyanates, optionally in solution in one or more of the aforementioned polyisocyanates. It is also possible to use mixtures of the aforementioned polyisocyanates.

As a rule, it is preferred to use readily available polyisocyanates such as 2,4- and 2,6-tolylene diisocyanate and mixtures of these isomers ("TDI"); polyphenyl polymethylene polyisocyanates of the type obtained by condensing aniline with formaldehyde, followed by phosgenation ("crude MDI"); and, polyisocyanates containing carbodiimide groups, urethane groups, allophanate groups, isocyanurate groups, urea groups or biuret groups ("modified polyisocyanates").

To produce semi-hard elastic foams, which are of particular interest within the scope of the invention, it is particularly preferred to use modified aromatic diisocyanates, especially derivatives of 4,4'-diphenylmethane diisocyanate, in the process according to the invention.

Examples of these particularly preferred polyisocyanates include 4,4'-diphenylmethane diisocyanate liquefied by partial carbodiimide formation, or "liquefied" 4,4'-diphenylmethane diisocyanate obtainable by reacting 1 mol of 4,4'-diphenylmethane diisocyanate with approximately 0.1 to 0.3 mols of dipropylene glycol or polypropylene glycol with a maximum molecular weight of 700.

Other starting components suitable for use in accordance with the invention are compounds with at least two isocyanate-reactive hydrogen atoms and a molecular weight of from 62 to 10,000. Such compounds include those containing amino groups, thiol groups, hydroxyl groups, or carboxyl groups. The presently preferred compounds are the polyhydroxyl compounds, more especially polyhydroxyl compounds containing from 2 to 8 hydroxyl groups, and especially those with molecular weights of from 200 to 10,000, and most preferably from 1000 to 6000. Examples include polyesters, polyethers, polythioethers, polyacetals, polycarbonates, and polyester amides containing at least 2, generally from 2 to 8 and more preferably from 2 to 4 hydroxyl groups, of the type generally known for the production of homogeneous and cellular polyurethanes. In the process according to the invention, the aforementioned relatively high molecular weight polyhydroxyl compounds are often used in admixture with up to 95%, by weight, preferably with up to 50%, by weight, based on the total quantity of polyhydroxyl compounds, of low molecular weight polyols with molecular weights of from 62 to 200. Low molecular weight polyols of this type include ethylene glycol 1,2-propane diol, 1,3-propane diol, 1,2-butane diol, 1,4-butane diol, 1,6-hexane diol, 1,10-decane diol, diethylene glycol, triethylene glycol, tetraethylene glycol, dipropylene glycol, tripropylene glycol, glycerol, trimethylolpropane and the like.

Suitable hydroxyl-group-containing polyesters include reaction products of polyhydric, preferably dihydric and, optionally, also trihydric alcohols with polyvalent, and preferably divalent, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, by for example halogen atoms, and/or be unsaturated. Examples of polycarboxylic acids of this type include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetra-hydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include: ethylene glycol, 1,2-propylene glycol and 1,3-propylene glycol, 1,4- and 2,3-butylene glycol 1,6-hexane diol, 1,8-octane diol, neopentyl glycol, cyclohexane dimethanol (1,4-bishydroxymethyl cyclohexane), 2-methyl-1,3-propane diol, glycerol, trimethylolpropane, 1,2,6-hexane triol, 1,2,4-butane triol, trimethylolethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may also contain some terminal carboxyl groups. Polyesters of lactones, for example $\epsilon$-caprolactone, or hydroxycarboxylic acids, for example $\omega$-hydroxy caproic acid, may also be used.

The polyethers containing at least 2, generally 2 to 8, preferably 2 to 3, hydroxyl groups suitable for use in accordance with the invention are also known and may be obtained, for example, by polymerizing epoxides, such as ethylene oxide, propylene oxide, butylene oxide, tetrahydrofuran, styrene oxide or epichlorhydrin in the presence of $BF_3$, or by chemically adding these epoxides, optionally in admixture or successively to components containing reactive hydrogen atoms, such as water, alcohols or amines. These components include then, water, ethylene glycol, 1,3-propylene glycol or 1,2-propylene glycol, trimethylolpropane, 4,4'-dihydroxy diphenylpropane, aniline, ammonia, ethanolamine and ethylene diamine. Sucrose polyethers of the type described in German Auslegeschrifts Nos. 1,176,358 and 1,064,938 may also be used in accordance with the invention. In many cases, it is preferred to use polyethers of the type which contain substantial amounts of primary OH-groups (up to 90% by weight, based on all the OH-groups present in the polyether). Polyethers modified by vinyl polymers, of the type formed, for example, by polymerizing styrene, acrylonitrile in the presence of polyethers (U.S. Pat. Nos. 3,383,351, 3,304,273, 3,523,093, and 3,110,695, and German Pat. No. 1,152,536), are also suitable, as are polybutadienes containing OH-groups.

Among the polythio ethers, reference is made in particular to the condensation products of thiodiglycol with itself and/or with other glycols, dicarboxylic acids, formaldehyde, aminocarboxylic acids or amino alcohols. The products are polythio mixed ethers, polythio ether esters or polythio ether ester amides, depending upon the co-components.

Examples of suitable polyacetals are the compounds obtainable from glycols, such as diethylene glycol, triethylene glycol, 4,4'-dioxethoxy diphenyl dimethylmethane, hexane diol, and formaldehyde. Polyacetals suitable for use in accordance with the invention may also be obtained by polymerizing cyclic acetals.

Suitable polycarbonates containing hydroxyl groups are known and may be obtained, for example, by reacting diols, such as 1,3-propane diol, 1,4-butane diol and/or 1,6-hexane diol, diethylene glycol, triethylene glycol, tetraethylene glycol, with diaryl carbonates such as diphenyl carbonate, or phosgene.

The polyester amides and polyamides include, for example, the predominantly linear condensates obtained from polyvalent saturated and unsaturated carboxylic acids or their anhydrides and polyhydric, saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the invention.

Representatives of the many and varied compounds usable in accordance with the invention may be found, for example, in High Polymers, Vol. XVI "Polyurethanes, Chemistry and Technology", by Saunders-Frisch, Interscience Publishers, New York, London, Vol. I, 1962, pages 32 to 42 and pages 44 to 54, and Vol. II, 1964, pages 5 to 6 and 198 to 199; and, in Kunststoff-Handbuch, Vol. VII, Vieweg-Hochtlen, Carl-Hanser-Verlag, Munich, 1966, pages 45 to 71.

The semi-hard elastomeric foams with a strong outer skin which are of particular interest in accordance with the invention are produced from difunctional polyhydroxyl compounds of the aforementioned type to which higher functional, e.g. trifunctional, polyhydroxyl compounds of the aforementioned type are optionally added in quantities of up to 10 (hydroxyl) equivalent percent based on the total mixture of polyhydroxyl compounds.

In the process according to the invention, the reactants (including the water optionally used as blowing agent) are used in quantitative ratios corresponding to an NCO-characteristic of 70 to 160. (The NCO-characteristic 100 signifies the presence of equivalent quantities of isocyanate groups and active hydrogen atoms reacting with those isocyanate groups in the reaction mixture.) In the production of semi-hard elastomeric foams with a strong outer skin of particular interest in accordance with the invention, the NCO-characteristic is generally between 90 and 110.

According to the invention, water and/or readily volatile organic substances are often used as blowing agents. Examples of organic blowing-agents include: acetone; ethylacetate; methanol; ethanol; halogen-substituted alkanes such as methylene chloride, chloroform, ethylidene chloride, vinylidene chloride, monofluorotrichloromethane, chlorodifluoromethane, and dichloro difluoromethane; butane; hexane; heptane; diethyl ether; and the like. A blowing effect may also be obtained by adding compounds which decompose at temperatures above room temperature, giving off gases (for example nitrogen). Such compounds include azo compounds, such as azoisobutyronitrile. Other examples of blowing agents and details of their use may be found in Kunststoff-Handbuch, Vol. VII, Vieweg and Hochtlen, Carl-Hanser-Verlag, Munich, 1966, pages 108 and 109, 435 to 455 and 507 to 510.

In addition, catalysts are often used in accordance with the invention. Suitable catalysts include tertiary amines, such as triethylamine, tributylamine, N-methyl morpholine, N-ethyl morpholine, N-coco morpholine, N,N,N',N'-tetramethylethylene diamine 1,4-diazabicyclo-(2,2,2)octane, N-methyl-N'-dimethylamino ethyl piperazine, N,N-dimethylbenzylamine, bis-(N,N-diethylamino ethyl)-adipate, N,N-diethylbenzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethylimidazole and 2-methylimidazole.

Tertiary amines containing isocyanate-reactive hydrogen atoms can also be used and include triethanolamine, triisopropanolamine, N-methyl diethanolamine, N-ethyl diethanolamine, N,N-dimethylethanolamine, and their reaction products with alkylene oxides, such as propylene oxide and/or ethylene oxide.

Other suitable catalysts include silaamines with carbon-silicon bonds of the type described in German Pat. No. 1,229,290, such as 2,2,4-trimethyl-2-sila morpholine and 1,3-diethylamino methyl tetramethyl disiloxane.

Other suitable catalysts include nitrogen-containing bases such as tetraalkyl ammonium hydroxides; alkali hydroxides, such as sodium hydroxide; alkali phenolates, such as sodium phenolate; or alkali alcoholates, such as sodium methylate. Hexahydrotriazines may also be used as catalysts. According to the invention, organometallic compounds such as organo tin compounds, may also be used as catalysts.

Preferred organo tin compounds are tin(II)salts of carboxylic acids, such as tin(II)acetate, tin (II)octoate, tin(II)ethyl hexoate and tin(II)laurate, and the dialkyl tin salts of carboxylic acids, such as dibutyl tin diacetate, dibutyl tin dilaurate, dibutyl tin maleate or dioctyl tin diacetate.

Further representatives of catalysts suitable for use in accordance with the invention, and particulars of the way in which the catalysts work, may be found in Kunststoff-Handbuch, Vol. VII, Vieweg und Hochtlen, Carl-Hanser-Verlag, Munich, 1966, pages 96 to 102.

The catalysts are generally used in a quantity of from about 0.001 to 10%, by weight, based on the quantity of compounds with at least two isocyanate-reactive hydrogen atoms and molecular weights of from 62 to 10,000.

According to the invention, it is also possible to use surface-active additives (emulsifiers and foam stabilizers). Examples of suitable emulsifiers include the sodium salts of castor oil sulphonates; the sodium salts of fatty acids; the salts of fatty acids with amines, such as oleic acid/diethylamine or stearic acid/diethanolamine. Alkali or ammonium salts of sulphonic acids such as dodecyl benzene sulphonic acid or dinaphthylmethane disulphonic acid; of fatty acids, such as ricinoleic acid; or, of polymeric fatty acids, may also be used as surface-active additives.

Suitable foam stabilizers include water-soluble polyether siloxanes. These compounds are generally synthesized in such a way that a copolymer of ethylene oxide and propylene oxide is attached to a polydimethyl siloxane radical. Foam stabilizers of this type are described in U.S. Pat. No. 3,201,372.

According to the invention, it is also possible to use reaction retarders such as acid-reacting substances, such as hydrochloric acid or organic acid halides; cell regulators such as paraffins or fatty alcohols or dimethyl polysiloxanes; pigments; dyes; flame-proofing agents such as tris-chloroethylphosphate or ammonium phosphate and polyphosphate; stabilizers against ageing and weathering; plasticizers; fungistatic and and bacteriostatic agents; and, fillers, such as barium sulphate, kieselguhr, carbon black or whiting.

Other examples of the many and varied additives which may be used in the instant invention, together with particulars on the way in which these additives are used and the manner in which they work, may be found in Kunststoff-Handbuch, Vol, VI, Vieweg und Hochtlen, Carl-Hanser-Verlag, Munich, 1966, for example on pages 103 to 113.

According to the invention, foaming is carried out in molds. To this end, the reaction mixture is introduced into a mold made of a metal such as aluminium, or of a plastic material such as an epoxide resin. The foamable reaction mixture foams inside the mold and forms the molding. In-mold foaming may be carried out in such a way that the molding has a cellular structure at its surface, and also in such a way that the molding has a compact skin and a cellular core. According to the invention, it is possible to introduce into the mold such a quantity of foamable reaction mixture that the foam formed just fills the mold. However, it is also possible to introduce into the mold more foamable reaction mixture than is required to fill the interior of the mold with foam. This particular technique is known as "overcharging" and is described, for example, in U.S. Pat. Nos. 3,178,490 and 3,182,104.

According to the invention, it is also possible to produce cold-hardening foams (see e.g. British Pat. No. 1,162,517, and German Offenlegungsschrift No. 2,153,086).

Known release agents may be additionally used for in-mold foaming.

According to the invention, salts of (a) saturated or unsaturated aliphatic or cycloaliphatic carboxylic acids with at least 8 carbon atoms, and, (b) tertiary amines of the type in which the atom ratio of tertiary amine nitrogen to carbon in the molecule is between 1:3 and 1:12, and is preferably more between 1:3 and 1:9, are used as release agents.

The release agents according to the invention are used in quantities of from 0.1 to 15%, by weight, preferably in quantities of from 0.3 to 9%, by weight, based on the reaction mixture as a whole.

The acid component of the salts essential to the invention is in aliphatic or cycloaliphatic, saturated or unsaturated, carboxylic acid with more than 8 carbon atoms, preferably with from 12 to 36 carbon atoms and, most preferably with from 12 to 18 carbon atoms. Although natural or synthetic dicarboxylic acids and polycarboxylic acids may be used, the best results have been obtained with natural or synthetic monocarboxylic acids and natural fatty acid mixtures, such as abietic acid; palmitic acid; stearic acid; oleic acid, elaidic acid; linoleic acid; ricinoleic acid fatty acid esters of ricinoleic acid, more especially those of fatty acids with more than 12 carbon atoms; polyricinoleic acid esters; linolenic acid; or even commercial-grade fatty acid mixtures, such as sperm oil fatty acid, train oil fatty acid, tallow fatty acid, soya oil fatty acid, palm kernel fatty acid, peanut fatty acid, tall oil fatty acid and the like. It is preferred to use fatty acids or fatty acid mixtures which are liquid at room temperature, such as oleic acid and/or commercial-grade fatty acid mixtures predominantly containing oleic acid, such as soya oil fatty acid, tall oil fatty acid and esters of 1 mol of oleic acid and 1 to 3 mols of ricinoleic acid.

Suitable tertiary amines are those in which the atom ratio of tertiary amine nitrogen to carbon in the molecule is between 1:3 and 1:12, and preferable between 1:3 and 1:9. The amines used have no amide or ester groups in the molecule, in contrast to the amines mentioned in U.S. Pat. No. 3,726,952.

The amines may be aromatic, araliphatic, cyclic or aliphatic. They may be monofunctional or polyfunctional. The following are mentioned by way of example: aromatic N-dialkylamines, such as dimethyl aniline, diethyl aniline, dimethyl tolidine or xylidine, ethyl-methyl tolidine; N,N'-tetramethyl phenylene diamines (o, m, p) and the corresponding nucleus-hydrogenated products; the N-dialkyl cyclohexylamines, dimethyl benzylamine, diethyl benzylamine, i.e. N-dialkyl benzylamine types; heterocyclic amines, such as N-alkyl morpholines e.g. methyl or ethyl morpholine; pyridines, such as pyridine and methyl pyridines ($\alpha,\beta,\gamma$); piperidines, such as N-methyl piperidine; pyrimidines, tetrahydropyrimidines; piperazines, such as N,N'-dimethyl piperazine, N-methyl-N' ($\beta$-dimethylaminoethyl)-piperazine; 1,4-diazabicyclo-(2,2,2)-octane; 1,5-diazabicyclo-(4,3,o)-5-nonene; 1,8 diazabicyclo(5,4,o)-undec-7-ene; tetramethyl guanidine; aliphatic mono and polyamines in N-alkylated form, such as trimethylamine, triethylamine, and methyl dibutylamine; peralkylated polyamines, such as tetramethyl ethylene diamine and N-bis-($\beta,\beta'$-dimethylamino ethyl)-methylamine.

The release agents may be produced simply by mixing the components. At least 1 mol of long-chain fatty acid should be used per mol of tertiary amine, although it is preferred to use stoichiometric quantities or quantities of up to 200 mol %, based on tertiary amino groups, in excess of stoichiometric in the production of the release agents.

The release agents according to the invention may also be a mixture of different salts of the aforementioned type.

The reaction products used as release agents in accordance with the invention may be added as such or separately to the starting components used for producing the foams, for example to the polyol. The release agents according to the invention may be added to the starting components both at room temperature and at elevated temperatures.

Basically, the release agents used in accordance with the invention are suitable for improving the mold-releasability of any known mold-foamed polyurethane foams, i.e. soft foams, semi-hard foams and hard foams. It has proved to be of particular advantage to use the release agents employed in accordance with the invention in the production of known semi-hard mold-foamed polyurethane foams with a compact outer skin.

One particular advantage of the release agents used in accordance with the invention is the fact that the compounds act not only as release agents but also, because they are salts of tertiary amines, as catalysts for the isocyanate polyaddition reaction.

Other release agents or release agent systems may, of course, be used in the foam recipes, for example those of the type described in U.S. Pat. No. 3,726,952, German Offenlegungsschrift No. 2,121,670 and Belgian Pat. No. 782,942. These include the oleic acid or tall oil fatty acid salt of the amide-group-containing amine obtainable by reacting N-dimethylamino propylamine with oleic acid or tall oil fatty acid.

It is also possible to use release agents of the type which are introduced into the foam by means of modified isocyanates and which are described, for example, in German Patent Application P 23 05 276.2 and U.S. Ser. No. 521,426, filed Nov. 6, 1974.

According to the invention, the reaction components are reacted by the known one-pot process, by the prepolymer process or by the semi-prepolymer process, in many cases using machines such as those of the type described in U.S. Pat. No. 2,764,565. Particulars of processing machines which may also be used in accordance with the invention may be found in Kunststoff-Handbuch, Vol. VI, Vieweg and Hochtlen, Carl-Hanser-Verlag, Munich, 1966, for example on pages 121 to 205.

The end-products of the process according to the invention in their hard form may be used for the production of furniture components, bodywork sections of motor vehicles, industrial equipment and structural components, and in their semi-hard to soft form for the production of safety padding in motor vehicle construction, elastic shoe soles, bumpers and the like.

The process according to the invention is described in the following Examples. The parts quoted are parts by weight unless otherwise indicated.

Salts of the following composition are produced by blending the components listed and are used as the release agents:

A: 45 parts of 1,4-diazabicyclo-(2,2,2)-octane
  405 parts of oleic acid
B: As A, except that 500 parts of tall oil fatty acid are used instead of oleic acid.
C: 178.5 parts of methyl-bis-(2-hydroxyethyl)-amine
  846 parts of oleic acid
D: 94 parts of N-dimethyl benzylamine
  295 parts of oleic acid
E: 92 parts of N-methyl-N'-($\beta$-dimethylaminoethyl)-piperazine
  624 parts of oleic acid
F: As A, except that soya oil fatty acid is used instead of oleic acid
G: 90 parts of N-bis-($\beta,\beta'$-dimethylaminoethyl)-methylamine
  568 parts of oleic acid
H: 91 parts of tetramethyl guanidine
  896 parts of oleic acid
I: 144 parts of 1,4-diazabicyclo-2,2,2-octane
  900 parts of an esterification product of 1 mol of oleic acid and 1 mol of ricinoleic acid with an osmotic molecular weight, as determined in toluene, of 600.
K: As I, except that 1500 parts of the esterification product are used.
L: As I, except that 101 parts of triethylamine are used as the amine component.
M: 81 parts of 1,8-diazabicyclo-(5,4,o)-undec-7-ene 450 parts of oleic acid
N: 66 parts of 1,5-diazabicyclo-(4,3,o)-5-nonene
450 parts of oleic acid
O: As A, except that linseed oil fatty acid is used instead of oleic acid.
The following acids were used for comparison:
P: Oleic acid
Q. Oleic acid. At the same time, the proportion of 1,4-diazabicyclo-(2,2,2)-octane in the polyol mixture is increased from 0.8 parts to 1.8 parts.
R: Esterification product of 1 mol of oleic acid, 1 mol of ricinoleic acid (molecular weight approximately 600).

EXAMPLES 1 to 17

100 parts of a polyol mixture with an OH-number of 260 and a viscosity of 450 cP at 25° C, consisting of
91.1 parts of a linear polyether (molecular weight 2000, OH-number 50, viscosity $\eta 25 = 820$ cP) obtained by the addition of propylene and ethylene oxide to propylene glycol,
22 parts of butane diol,
0.8 part of 1,4-diazabicyclo-(2,2,2)-octane and
0.08 part of dibutyl tin dilaurate as catalysts,
4 parts of monofluorotrichloroethane and
2 parts of methylene chloride as blowing agents,
6 parts of release agents A - R
are reacted with 64 parts of a 4,4'-diisocyanatodiphenyl methane, NCO-content 30%, viscosity $\eta 25 < 100$ cP, liquefied by partial carbodiimide formation. More specifically, the activated polyol mixture and the isocyanate are mixed intensively for 10 seconds with a mechanical stirrer and introduced into a steel panel mold heated to 40° C. Dimensions of molding: 200 × 200 × 10 mm. The foamable mixture begins to foam after $T_1$ seconds and sets after another $T_2$ seconds. The molding may be removed from the steel mold after $T_3$ seconds. The adhesion of the panels is manually assessed.

Without cleaning the mold, 10 moldings are removed from the mold, a build-up forming on the surface of the mold from the $Z_1$ mold release; the $Z_2$ molding shows complete adhesion. The moldings have a total crude density of 0.75 g/cc with a solid peripheral zone on both sides and a cellular core.

The measured values $T_1$, $T_2$, $T_3$, $Z_1$ and $Z_2$ for the internal release agents A - R are quoted in the following table:

Table
Summary of the test results of Examples 1 to 17

| EXAMPLE | RELEASE AGENT | $T_1$ | $T_2$ | $T_3$ | $Z_1$ | $Z_2$ |
|---|---|---|---|---|---|---|
| 1 | P | 19 | 20 | 6 | 4 | 6 |
| 2 | A | 14 | 8 | 3 | — | — |
| 3 | Q | 9 | 5 | 3 | 7 | 8 |
| 4 | R | 16 | 9 | 3 | 4 | 7 |
| 5 | I | 12 | 7 | 3 | — | — |
| 6 | K | 16 | 9 | 3 | — | — |
| 7 | B | 15 | 9 | 3 | 8 | — |
| 8 | C | 16 | 9 | 3 | 9 | — |
| 9 | D | 17 | 9 | 3 | 9 | — |
| 10 | E | 16 | 8 | 3 | 8 | — |
| 11 | F | 16 | 8 | 3 | 9 | — |
| 12 | G | 17 | 9 | 3 | 9 | — |
| 13 | H | 19 | 10 | 3 | 9 | — |
| 14 | L | 16 | 9 | 3 | 8 | — |
| 15 | M | 15 | 10 | 3 | 9 | — |
| 16 | N | 16 | 10 | 3 | 8 | — |
| 17 | O | 16 | 7 | 3 | 9 | — |

It can clearly be seen that the release effect in Examples 1, 3 and 4 is poorer than in the other Examples. Even when the starting components are intensively activated (Example 3), the release effect is distinctly poorer than in the Examples with average activation in which the release agents according to the invention are used.

EXAMPLE 18

60 parts of polyol (propoxylated trimethylolpropane) with an OH-number of 800,
40 parts of a linear polyether with an OH-number of 55 (propylene glycol + propylene oxide/ethylene oxide),
3 parts of N,N-dimethylbenzylamine
0.5 parts of tetramethyl guanidine,
1 part of polysiloxane — polyether copolymer stabilizer,
8 parts of monofluorotrichloromethane,
6 parts of the internal release agent A,
are thoroughly mixed with 131 parts of a polyisocyanate obtained by phosgenating a condensation product of aniline and formaldehyde (NCO-content 31.5%, viscosity $\eta 25 = 150$ cP), and the resulting mixture introduced into a steel mold heated to 60° C. The plastics mixture begins to foam after 15 seconds and sets after another 13 seconds. The hard foam which has a crude density of 0.6 g/cc and a compact outer skin in addition to the cellular core, may be released from the mold after 5 minutes. It measures 200 × 200 × 10 mm. Even after 15 mold releases without the mold being cleaned in between, the moldings do not require any measurable release forces.

What is claimed is:
1. In a process for the production of mold-formed foam having an impervious outer skin with self-releasing properties, said process comprising:
   (A) introducing a foamable reaction mixture into a closed mold, said mixture consisting essentially of:
      (i) an organic polyisocyanate,
      (ii) a compound having reactive hydrogen atoms and having a molecular weight of from 62 to 10,000,
      (iii) water and/or organic blowing agents,
      (iv) an isocyanate addition catalyst, and
      (v) an internal mold release agent,
   (B) allowing said foamable reaction mixture to foam in said mold, and
   (C) removing the resultant product from said mold, the improvement wherein said mold release agent consists of salts of saturated or unsaturated aliphatic or cycloaliphatic, carboxylic acids having at least 8 carbon atoms and tertiary amines of the type in which the atom ratio of the tertiary amine nitrogen to carbon in the molecule is between 1:3 and 1:12 and being devoid of amide or ester linkages.

2. A process as claimed in claim 1, wherein monocarboxylic acids with from 12 to 18 carbon atoms are used as the carboxylic acids.

3. A process as claimed in claim 1, wherein oleic acid or commercial-grade fatty acid mixtures containing oleic acid are used as the carboxylic acids.

4. A process as claimed in claim 1, wherein esters of ricinoleic acid and monocarboxylic acids with more than 12 carbon atoms are used as the carboxylic acids.

5. A process as claimed in claim 1, wherein tertiary amines in which the atom ratio of tertiary amine nitrogen to carbon in the molecule is between 1:3 and 1:9, are used as the tertiary amines.

6. A process as claimed in claim 1, wherein the amount of said salt added is from 0.1 to 15 percent by weight based on the total weight of the reaction mixture.

7. A process as claimed in claim 6, wherein the amount of said salt added is from 0.3 to 9 percent by weight based on the total weight of the reaction mixture.

* * * * *